(12) United States Patent
Koenig et al.

(10) Patent No.: US 6,863,483 B2
(45) Date of Patent: Mar. 8, 2005

(54) SCREW PROVIDED WITH SELF-LOCKING THREAD

(75) Inventors: Gottfried Koenig, Bad Laasphe (DE); Werner Menz, Tambach-Dietharz (DE)

(73) Assignee: EJOT GmbH & Co. KB, Bad Laasphe (DE)

( * ) Notice: Subject to any disclaimer, the term of this patent is extended or adjusted under 35 U.S.C. 154(b) by 0 days.

(21) Appl. No.: 10/642,589

(22) Filed: Aug. 19, 2003

(65) Prior Publication Data

US 2004/0037668 A1 Feb. 26, 2004

(30) Foreign Application Priority Data

Aug. 20, 2002 (DE) .......................... 102 38 055

(51) Int. Cl.[7] .............................. F16B 39/30
(52) U.S. Cl. .................... 411/311; 411/310; 411/309; 411/423; 411/938
(58) Field of Search ............................. 411/309, 310, 411/311, 423, 938

(56) References Cited

U.S. PATENT DOCUMENTS

| | | | | | |
|---|---|---|---|---|---|
| 597,000 | A | * | 1/1898 | Higbee | 285/333 |
| 1,451,484 | A | * | 4/1923 | Woodward | 411/311 |
| 2,177,005 | A | * | 10/1939 | Purtell | 411/259 |
| 2,371,365 | A | * | 3/1945 | Tomalis et al. | 411/310 |
| 2,581,690 | A | * | 1/1952 | Moehle et al. | 411/308 |
| 3,124,188 | A | * | 3/1964 | Muenchinger | 411/309 |
| 3,186,464 | A | * | 6/1965 | Baumle | 411/168 |
| 3,381,733 | A | * | 5/1968 | Stanwick | 411/311 |
| 3,459,250 | A | * | 8/1969 | Tabor | 411/310 |
| 3,472,119 | A | * | 10/1969 | Peterson, Jr. | 411/422 |
| 3,517,717 | A | * | 6/1970 | Orlomoski | 411/311 |
| 3,530,760 | A | * | 9/1970 | Lindstrand | 411/416 |
| 3,631,702 | A | * | 1/1972 | Podell | 72/88 |
| RE27,678 | E | * | 6/1973 | Orlomoski | 411/311 |
| 3,850,215 | A | * | 11/1974 | Orlomoski | 411/311 |
| 3,927,503 | A | | 12/1975 | Wilson | |
| 5,071,301 | A | * | 12/1991 | Engelhardt et al. | 411/389 |
| 5,242,252 | A | * | 9/1993 | Harle | 411/311 |
| 5,340,254 | A | * | 8/1994 | Hertel et al. | 411/311 |
| 6,135,689 | A | * | 10/2000 | Matsunami | 411/311 |
| 6,478,520 | B1 | * | 11/2002 | Sala | 411/386 |

FOREIGN PATENT DOCUMENTS

| | | |
|---|---|---|
| DE | 15 00 981 | 7/1969 |
| DE | 15 75 259 | 1/1970 |
| DE | 2 067 342 | 12/1970 |
| DE | 17 50 206 | 1/1971 |
| DE | 2 257 112 | 11/1972 |
| DE | 37 43 010 | 12/1987 |
| GB | 1 072 578 | 6/1967 |
| GB | 1 496 675 | 12/1974 |

* cited by examiner

*Primary Examiner*—Robert J. Sandy
*Assistant Examiner*—Katherine Mitchell
(74) *Attorney, Agent, or Firm*—Banner & Witcoff, Ltd.

(57) ABSTRACT

Screw provided with self-locking rolled thread, wherein, in a plurality of places along its extent, the thread is deformed in relation to the normal thread cross section in that the thread outside diameter is reduced by radial compression of limited thread portions, the area of the thread cross section being substantially identical to that of the undeformed thread. While maintaining the slant of the thread flanks, the thread cross section is symmetrically widened in the outer region and reduced in the adjoining inner region, the transition from the widened to the reduced thread cross section lying approximately in the centre of the respective thread flank, and the limited thread portion extends over two parts of a thread turn such that there result two symmetrically opposite thread portions each of approximately ⅙ of the thread turn.

5 Claims, 1 Drawing Sheet

SCREW PROVIDED WITH SELF-LOCKING THREAD

BACKGROUND AND SUMMARY OF THE INVENTION

The invention relates to a screw provided with self-locking, rolled thread, wherein, in a plurality of places along its extent, said thread is deformed in relation to the normal thread cross section in that the thread outside diameter is reduced by radial compression of limited thread portions, the area of the thread cross section being substantially identical to that of the undeformed thread.

Screws with self-locking threads are known in a variety of forms. For example, the turns of a male thread are, circularly about the thread root, bent away from the head end in the axial direction in order thereby to produce a special friction in relation to a female thread (DE-OS 2062342). DE-OS 2257112 describes a deformation, referred to as a rib, of the turn of a male thread, said rib extending over only a portion of a thread turn. In the case of a self-locking thread described in DE-PS 1575259, the flank angle is, circularly about the thread root, changed from thread turn to thread turn in the case of straight flanks. As is demonstrated by DE-PS 1750206, it has also already been proposed, circularly about the thread root, to increase the profile thickness of the locking region of the thread. Tending in the same direction is the proposal according to DE-PS 1500981, according to which the locking portion of a thread provides for an enlarged core diameter with reduced outside diameter.

Finally, mention should also be made of DE-PS 3743010, according to which, in the case of a male thread, the locking region is created over a plurality of thread turns in that, in the locking region, the thread crests are pressed radially inwards, there being in the cross section a rectangular design in the region of the thread crests, the overall volume of the thread thereby being maintained.

With the hitherto known screws with self-locking threads, it has been necessary, because of the design of the locking part, to accept that there will, to a considerable extent, be a plastic deformation, when the screw is screwed in, either of the female thread or of the thread of the locking part, this leading to difficulties, particularly in the case of hard materials for the screw or the female thread. The object of the invention, therefore, is to design a screw provided with a self-locking thread such that its limited thread portion serving the purpose of locking makes do with only slight deformation of the female thread and/or of the screw thread and the required resistance for producing a sufficiently high further turning moment is achieved through maximum-area contact between screw thread and female thread.

The object of the invention is achieved in that, while maintaining the slant of the thread flanks, the thread cross section is symmetrically widened in the outer region and reduced in the adjoining inner region, the transition from the widened to the reduced thread cross section lying approximately in the centre of the respective thread flank, and in that the limited thread portion extends over two parts of a thread turn such that there result two symmetrically opposite thread portions each of approximately ⅙ of the thread turn.

The compression of the thread turns in each region of the limited thread portion and the there resulting reduction of the outside diameter of the thread mean that, during the rolling of the screw, the necessary material is made available for the widening of the thread cross section in the outer region of the thread, said material then contributing particularly effectively to the aforementioned large-area contact in that region which is particularly effective in this regard, namely the outer region of the thread turns, where the greatest resistance to the further turning of the screw is particularly high owing to the there existing relatively large diameter. In order to achieve the desired locking effect to a high degree, only a relatively small increase of the thread cross section is required, depending on the hardness of the material for the screw or female thread, this making it possible, with regard to the deformation in the region of the limited thread portion or the opposite part of the female thread, to obtain only very small deformations in order to guarantee the required security. The aforementioned design, therefore, results, with relatively little effort as regards the rolling of the screw, in a high degree of security against further turning; that is, the screw has a high further turning moment.

In order to be able to influence the further turning moment of the screw as desired, the screw is advantageously designed such that the limited thread portion is provided in a plurality of spatially separate places on the screw, the region of the thread beginning being kept free from the limited thread portion. The latter design ensures that the screw is able initially to enter a female thread without resistance, as a result of which the screw is then guided and only then comes up against the limited thread portion for the locking of the screw. The greater is the number of such limited thread portions, the higher is then the further turning moment which must be exerted on the screw.

Advantageously, the thread turns with limited thread portions are provided directly adjacent to each other, with the result that, in this case, the further turning moment is increased correspondingly quickly.

In the case of adjacent thread turns with limited thread portions, said thread portions are advantageously offset by 90° in relation to each other from thread turn to thread turn, as a result of which the pressure on the female thread is offset; that is, pressure on the female thread at the same places with regard to angle, i.e. at opposite places, is avoided.

BRIEF DESCRIPTION OF THE DRAWINGS

Example embodiments of the invention are shown in the drawings, in which.

DETAILED DESCRIPTION OF THE INVENTION

Figure 1:
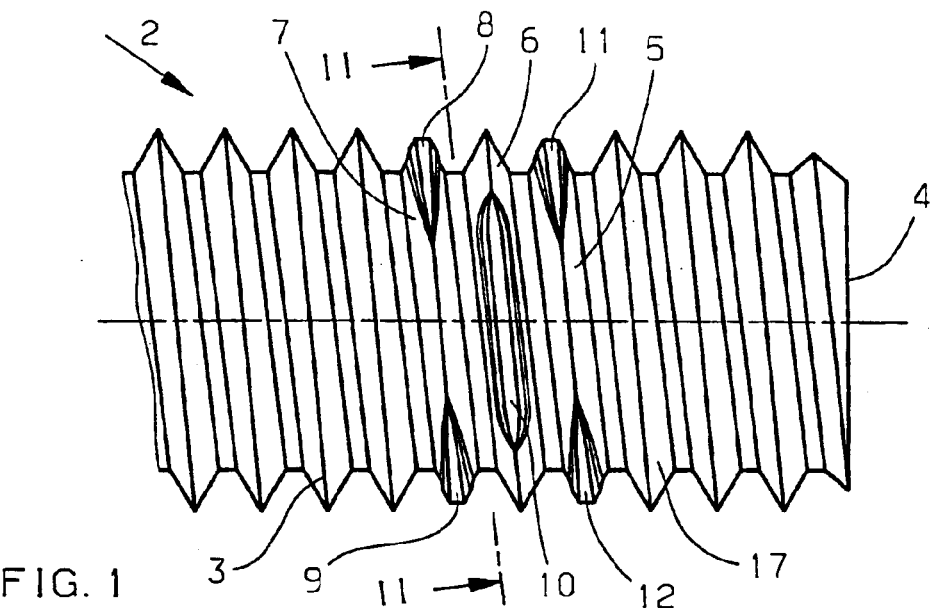
FIG. 1 shows the screw in a side view with three thread turns provided with the limited thread portions.

Apart from a screw head (not shown), the screw presented in FIG. 1 comprises the screw shank 2, which is provided continuously with the thread 3, which, therefore, extends as far as the thread beginning 4. Shown in the front half of the thread 3 are the thread turns 5, 6 and 7, which are provided with the limited thread portions 8 and 9, 10 as well as 11 and 12. The special design of said limited thread portions is explained in detail with reference to FIG. 3.

The limited thread portions 8, 9, 10, 11 and 12 serve to provide the screw with a desired self-locking effect when being screwed into a female thread, for which purpose the limited thread portions are of a special design. Said design consists, among other things, in that, in the region of the limited thread portions 8, 9, 10, 11 and 12, the outside diameter of the thread is reduced by radial compression. The further special design features will be discussed in greater detail in connection with FIG. 3. The region of the thread 3 adjoining the thread beginning 4 is kept free from limited thread portions, with the result that, over this region, the screw can be screwed without problem into a female thread and is thus provided with the required guiding for being screwed in further.

Figure 2:
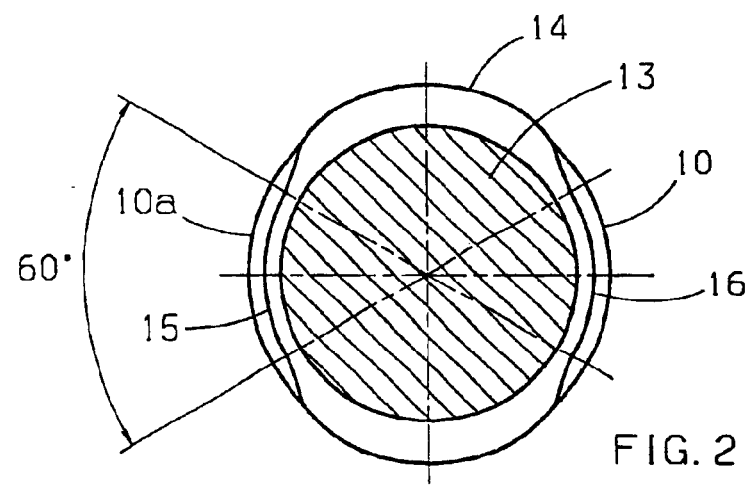
FIG. 2 shows a section along line II—II from FIG. 1.

FIG. 2 shows a section along line II—II from FIG. 1, shading being used to indicate the thread core 13, around which extends the thread turn 6, on which are located the two limited thread portions 10 and 10a. As is apparent, the outside diameter of the thread in the region of the limited thread portions 10 and 10a is reduced in comparison with the thread outside diameter 14 in the region of the thread turn 6. The lines drawn in the region of the limited thread portions 10 and 10a represent transitions 15 and 16, which will be discussed in greater detail in connection with FIG. 3. The region of the limited thread portions 10 and 10a extends in each case approximately over ⅙ of the entire thread turn, i.e. in this case over 60°.

Figure 3:
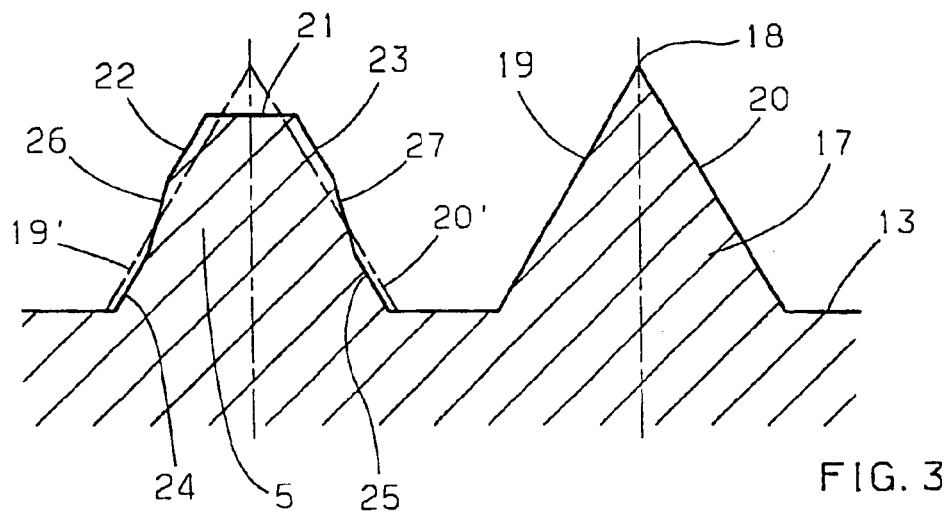
FIG. 3 shows a cross section through the thread turns of the screw according to FIG. 1 in an enlarged representation.

FIG. 3 shows the cross section through the thread turns 5 and 17 according to FIG. 1. The thread turn 17 extends as far as the maximum height 18 of the outside diameter of the thread; its two flanks 19 and 20 extend symmetrically and rectilinearly with respect to the thread core 13. The thread turn 5 has a reduced outside diameter 21 in comparison with the outside diameter 18, said reduced outside diameter 21 being obtained by compression of the thread turn 5. As a result of said compression, the thread flanks are widened in the outer regions 22 and 23, while maintaining the slant of the thread flanks 19 and 20 belonging to the thread turn 17, said thread flanks 19 and 20 of the thread turn 5 being drawn as dashed lines 19' and 20'. In the lower region of the thread turn 5, the flanks 24 and 25 are inwardly offset in relation to the dashed lines 19' and 20'; that is, the thread cross section is reduced. The transition from the outer region 22, 23 to the inner region 24, 25 is identified by 26 and 27. This transition is, of course, shorter particularly in the case of smaller threads. Said transitions 26 and 27 are also shown in FIG. 2 as lines 15 and 16. The transitions 26 and 27 are situated such that they lie approximately in the centre of the flanks of the thread turn 5. Despite the compression, the area of the thread portion of the compressed thread turn 5 has remained the same as that of the thread turn 17.

What is claimed is:

1. Screw provided with self-locking rolled thread (3), wherein, in a plurality of places along its extent, said thread (3) is deformed in relation the normal thread cross section in that the thread outside diameter (21) is reduced by radial compression of limited thread portions (8–12), the area of the thread cross section being substantially identical to that of the undeformed thread (3), characterized in that, while maintaining the slant of the thread flanks (19, 20), the thread cross section is symmetrically widened in the outer region (22, 23) and reduced in the adjoining inner region (24, 25), the transition (26, 27) from the widened to the reduced thread cross section lying approximately in the centre of the respective thread flank, and in that the limited thread portion (8–12) extends over two parts of a thread turn (5, 6, 7) such that there result two symmetrically opposite thread portions (8–12) each of approximately ⅙ of the thread turn (5, 6, 7).

2. Screw according to claim 1, characterized in that the limited thread portion (8–12) is provided in a plurality of spatially separate places on the screw, the region of the thread beginning (4) being kept free from the limited thread portion.

3. Screw according to claim 2, characterized in that the thread turns (5, 6, 7) with limited thread portions (8–12) are provided in plurality directly adjacent to each other.

4. Screw according to claim 1, characterized in that the thread turns (5, 6, 7) with limited thread portions (8–12) are provided in plurality directly adjacent to each other.

5. Screw according to claim 4, characterized in that, in the case of adjacent thread turns (5, 6, 7) with limited thread portions (8–12), the latter are offset by 90° in relation to each other from thread turn to thread turn.

* * * * *